UNITED STATES PATENT OFFICE.

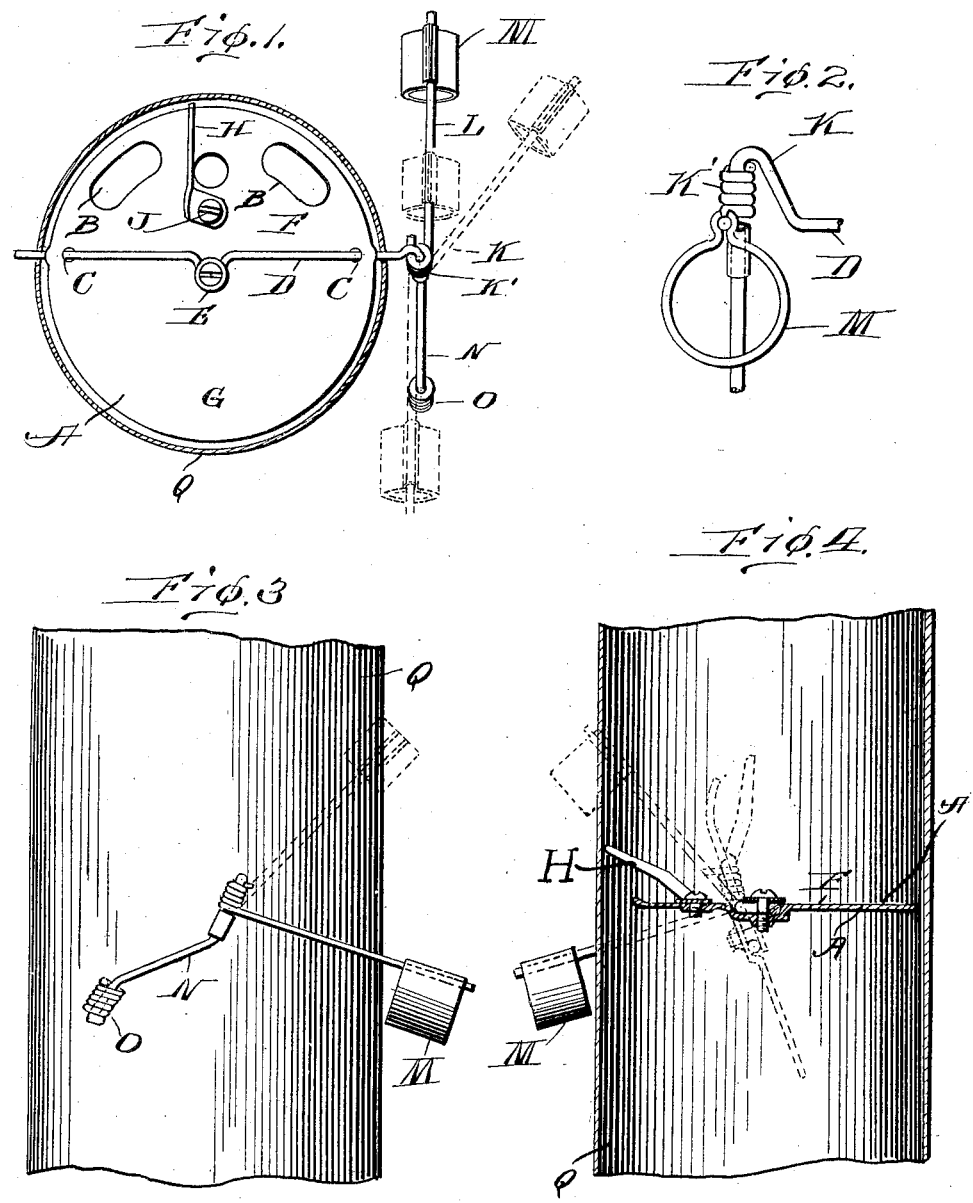

WILBERT F. RUTHERFORD, OF NEWPORT, OREGON.

DAMPER.

1,082,174. Specification of Letters Patent. Patented Dec. 23, 1913.

Application filed November 30, 1912. Serial No. 734,316.

*To all whom it may concern:*

Be it known that I, WILBERT F. RUTHERFORD, a citizen of the United States, residing at Newport, in the county of Lincoln and State of Oregon, have invented certain new and useful Improvements in Dampers, of which the following is a specification.

My invention relates to improvements in dampers, and has for its primary object the provision of a damper which will be capable of application in any pipe, flue, chimney, smoke stack, stove, furnace, or the like, for automatically regulating the draft therethrough.

Another object of the invention is to provide a damper having means for engaging the pipe or flue to prevent the damper from passing the closing point.

A further object of the invention is to provide a damper having means for positioning the damper in the pipe or flue at any angle desired, whereby the draft may be accurately and reliably regulated, said means also serving to counteract the upward draft or heat from the stove or furnace to prevent the damper from being closed thereby.

An important object of the invention is to provide a damper having means adapted to counteract the positioning means thereof, whereby closure of the damper is permitted only when there is a corresponding increase of the draft pressure.

A further object of the invention is to provide a damper having a novel arrangement of sliding and counteracting weights, whereby said weights will counteract each other at the proper time to prevent closure of the damper plate without an increased draft pressure; which damper will be simple and inexpensive of construction; practical and efficient in operation; and highly useful and desirable from every point of view.

To attain the desired objects, the invention consists of a damper embodying novel features of construction and arrangement of parts, substantially as disclosed herein, reference being had to the accompanying drawing, in which:

Figure 1 is a plan view of a damper arranged in a pipe or flue and constructed in accordance with and embodying the principles of the invention, and illustrating in dotted lines various positions the sliding weight carrying arm assumes to regulate the angle of the damper plate with respect to the walls of the pipe. Fig. 2 is a detail view of the novel connection for the damper shaft and sliding weight carrying arm, said connection permitting said arm to be positioned at various angles to said shaft. Fig. 3 is a side elevation of a pipe with my damper in applied position therein, the dotted lines indicating the position the weight carrying arm assumes when the damper is in open position, and Fig. 4 is a sectional view through a pipe and damper plate to illustrate the application of the damper therein, showing in full lines the damper closed and in dotted lines the damper open.

In the drawings, in which similar characters of reference denote corresponding parts in the several views: The letter A designates the damper plate, which is of any suitable size and material, and is provided with the usual air openings or vents B, and has journals C arranged to one side of the center, in which is journaled the damper shaft D secured to the damper plate eccentrically thereof by the rivet E and dividing the damper into two sections of unequal size and area, the upper and smaller section F and the lower and heavier section G, said upper and smaller section F having a slight upward bent and carrying a stop finger H riveted thereto by rivet J, which stop finger will engage against the sides of the pipe when the damper is operated to prevent the damper from passing the closing point.

The damper shaft D is bent at K and formed with a loop K' to which is pivotally connected one end of the arm or lever L, sliding upon which is a weight M, the adjustment of which on the rod L sets the damper plate for different drafts in the pipe, as will be understood. Said weight M is so formed as to spring on lever L and thus cause enough friction to remain at any point where it may be set, thus counterbalancing the heavier side G of the damper plate, which would otherwise be closed by the upward draft or heat passing through the flue. Also secured to the loop K' of the damper shaft is an arm or lever N, carrying at its outer end a weight O in the form of a coil sprung around the arm or lever. When the weight O has passed the dead center, said weight will counteract the weight M on rod L, thus requiring an increased draft through the pipe or flue Q to cause the damper to continue closing. The importance of this second weight will be seen when it is considered that were it not for this counteracting weight, the damper would continue to close without the impetus of an increased draft. In other words, the damper would close by reason of its own weight and the weight M on arm L. It will also be observed that weight M and arm L can be swung around on the loop K' of the shaft and will have the same effect as moving the weight on the arm, that is, by moving this weight and arm to a position parallel with the shaft of the damper, the damper will be held out of operative position, the finger H serving only as a stop to prevent the damper from passing the closing point.

From the foregoing description, taken in connection with the accompanying drawings, the construction and operation of my improved damper will be readily seen and understood, and further explanation is deemed unnecessary.

It will of course be understood that I reserve the right to make such alterations and modifications in the detailed construction as fall within the spirit and scope of the invention, as defined in the appended claims, without departing from its essential features or sacrificing any of its advantages. It will also be seen that the construction hereinbefore described and illustrated in the accompanying drawing is of simple and inexpensive construction; can be applied to any pipe, flue, furnace, smoke stack and the like at a very low cost; and will prove highly reliable and efficient in operation.

I claim:

1. In a damper, the combination of a damper plate, a shaft, a weight carrying arm connected to said shaft, means comprising a weight carrying arm arranged in angular relation to the first weight carrying arm for preventing the damper closing without an increase in the draft pressure, and a stop finger secured to the damper plate for engagement with the inner wall of a pipe for preventing the damper from passing the closing point.

2. In a damper, the combination of a damper plate, a stop finger secured thereto, a shaft secured to the damper plate eccentrically thereof, a loop formed thereon, an arm connected to said loop, a weight sliding on said arm, and a weight carrying arm counteracting the first mentioned arm and weight.

3. In a damper, the combination of a damper plate, a stop finger secured thereto, a shaft secured to the damper plate eccentrically thereof, a loop formed thereon, an arm connected to said loop, a weight sliding on said arm, and a weight carrying arm secured to said loop and carrying a weight arranged in angular relation to said first mentioned weight.

4. In a damper, the combination of a damper plate, a stop finger secured thereto, a shaft secured to the damper plate eccentrically thereof, a loop formed on said shaft, an arm connected to said loop and capable of a swinging movement to be positioned parallel to the damper shaft, and a weight on said arm, and means counteracting said arm and weight.

5. In a damper, a damper plate, a damper shaft secured to said plate eccentrically thereof, said shaft having a bend and a loop, an arm pivotally connected at one end to said loop, a weight on said arm, an arm secured to said loop, a weight on said arm, and a stop finger on said plate adapted to contact with the inner wall of a flue within which said plate is arranged.

In testimony whereof I affix my signature in presence of two witnesses.

WILBERT F. RUTHERFORD.

Witnesses:
R. A. BENSEEL,
WM. MATTHEWS.

---

Copies of this patent may be obtained for five cents each, by addressing the "Commissioner of Patents, Washington, D. C."